United States Patent [19]

Skinner et al.

[11] 4,112,922
[45] Sep. 12, 1978

[54] SOLAR ENERGY COLLECTOR

[75] Inventors: Leon S. Skinner; Norman C. Taylor, both of Miami, Fla.

[73] Assignee: All Sunpower, Inc., Miami, Fla.

[21] Appl. No.: 838,975

[22] Filed: Oct. 3, 1977

Related U.S. Application Data

[63] Continuation-in-part of Ser. No. 669,487, Mar. 23, 1976, abandoned.

[51] Int. Cl.² .............................................. F24J 3/02
[52] U.S. Cl. ..................................... 126/271; 165/171
[58] Field of Search ............... 126/270, 271; 237/1 A; 165/170, 171, 172, 173

[56] References Cited

U.S. PATENT DOCUMENTS

| | | | |
|---|---|---|---|
| 1,837,449 | 12/1931 | Kunz | 126/271 |
| 1,888,620 | 11/1932 | Clark | 126/271 |
| 2,553,302 | 5/1951 | Cornwall | 237/1 A |
| 2,594,232 | 4/1952 | Stockstill | 126/271 |
| 3,039,453 | 6/1962 | Andrassy | 126/271 |
| 4,062,351 | 12/1977 | Hastwell | 126/271 |

*Primary Examiner*—Kenneth W. Sprague
*Assistant Examiner*—James C. Yeung
*Attorney, Agent, or Firm*—Erwin M. Barnett

[57] ABSTRACT

A solar energy collector for use primarily in a closed-loop system has a fluid conduit of serpentine configuration which comprises a plurality of relatively thin extruded aluminum tubes, each tube having a flat top and bottom wall and lateral flat lips or flanges extending longitudinally along opposite sides thereof and coplanar with the bottom wall forming therewith a flat base for the tubes, the flanges providing means for joining the tubes by welding in an array in side by side abutment relation. Sections are formed from the flat tubing as connecting headers which are welded at both ends to pairs of adjacent tubes in staggered relation to form the continuous serpentine path for the heat transferring fluid. The flat, tubular array has a black anodized surface and is enclosed in a weather-proof glass covered, polyurethane insulated frame, which is assembled from a flanged tubular extrusion providing the frame with a stepped interior facing structure mounting the glass cover, tubular array and insulation in a rugged, compact and efficient unit.

9 Claims, 8 Drawing Figures

SOLAR ENERGY COLLECTOR

This is a continuation-in-part of patent application by Leon S. Skinner and Norman C. Taylor, Ser. No. 669,487, filed Mar. 23, 1976, now abandoned, entitled Improved Solar Water Heater.

BACKGROUND OF THE INVENTION

1. Field of the Invention

This invention relates generally to a closed-loop system for the collection and transfer of solar energy wherein heat transfer fluid circulates between a solar energy collector exposed to the sun's rays and a heat exchanger incorporated with a domestic hot water storage tank and in particular is directed to structural features of the solar energy collector.

2. Description of the Prior Art

Rising energy costs have created a demand for solar energy water heaters for home use by justifying the initial investment in terms of the actual savings afforded by the use of such equipment. A proven popular system for heating water for home use by the sun's rays and capable of careful control necessitated by the changing availability of solar radiation at a given location is the closed-loop in which a heat transfer fluid is circulated between a solar energy collector and a heat exchanger associated with a hot water storage tank. The solar energy collectors, which are the heart of the closed-loop systems, are basically similar in comprising a conduit for the fluid enclosed in a glass covered housing. The conduit is usually a series of parallel, coplanar, pipe sections connected either in series to provide a single serpentine path or in parallel providing a plurality of paths and is made of heat conductive material, metal or plastic, having a black surface for maximum heat absorption.

Various proposed constructions to provide a non-circular cross-section for the single serpentine path conduit, which single path is favored for the closed-loop system, and to bring the parallel sections close together for improved efficiency have heretofore been impractical or have proven to be excessively costly to manufacture as a reliable product. To protect the consumer from such unreliability, various codes for efficiency and durability have been established by federal, state and local government agencies, often requiring actual testing of the solar energy collector before marketing is authorized.

There is, therefore, a pressing need for a highly efficient, relatively light weight collector of manageable size for shipping and installation, which is reliable and durable for a long life of trouble-free service in a wide variety of climates and which will comply with the established codes.

SUMMARY OF THE INVENTION

Among the objects of the invention is to provide a closed-loop solar energy transfer system particularly adaptable to the heating of water for use in the home and featuring a solar energy collector of the single path serpentine type constructed to meet the various needs and overcome the problems hereinbefore mentioned.

The solar energy collector herein described functions in a closed-loop system which circulates a heat transfer fluid between the collector coil, which has a black exterior surface for optimum heat absorption and is located for exposure to solar radiation, and a heat exchanger which may be located in close proximity to a household hot water storage tank for transfer of the heat thereto. A fluid pump, under the control of temperature sensors which compare the temperature of the output of the collector with that of the hot water tank, circulates the heat transfer fluid within the closed-loop and shuts off when the collector output drops below a predetermined temperature or is lower than that in the hot water tank. An expansion tank accommodates pressure variation within the closed-loop.

The collector is constructed basically from two aluminum tubular extrusions, each differing completely in cross-sectional configuration from the other relative to its intended use as a flat coil and as a mounting frame, respectively. The flat coil extrusion has a central conduit which is shaped in cross-section, by its flat top and bottom walls, as a flattened ellipse having a width substantially greater than its uniform thickness. A longitudinal flange extends along each opposite side of the conduit in coplanar relation to the bottom wall. A plurality of straight tube sections of the extrusion, cut into lengths substantially the length of the assembled flat coil array, are positioned side-by-side in sufficient number to provide the width of the array, the longitudinal flanges being in abutment and welded together into a flat rigid structure. Headers, for 180° flow reversal of the fluid, connect each pair of adjacent ends of the conduits of the straight tube sections to form the flat coil in a single continuous serpentine path. Each header is cut and formed from a portion of the flat coil extrusion to provide a conduit section of matching thickness and has a portion of longitudinal flange, which, when the headers are welded in position, is located in alignment with other like header flanges forming a segmented border flange extending along the opposite transverse sides of the array. These segmented border flanges on the opposite transverse sides of the array coact as mounting means with the exterior flanges of the outermost tube sections located along the opposite longitudinal sides of the array. One form of header approximates a triangular shape and fits adjacent tube ends which are beveled inwardly. An alternate form of header is shaped to engage adjacent tube ends which are cut transversely in alignment with each other. End portions of the longitudinal flanges adjacent the headers are cut away to provide accessibility for welding waterproof seams completely around the conduits and visibility for inspecting the welded seams under pressure testing.

The mounting frame extrusion is a tubular structure of rectangular cross-section having two longitudinal flanges positioned and shaped to provide, in cooperation with the tubular structure, three longitudinally extending steps located along one side of the extrusion. Four lengths of the extrusion are welded into a rectangular frame with the steps facing the interior of the frame. The upper and outermost step mounts the glass cover. The intermediate step mounts the flat coil array and the lower and innermost step mounts the insulation backing. Provision is also made between the first and second steps for mounting insulation to reduce heat loss along the sides of the frame.

DESCRIPTION OF THE PREFERRED EMBODIMENTS

Figure 1:
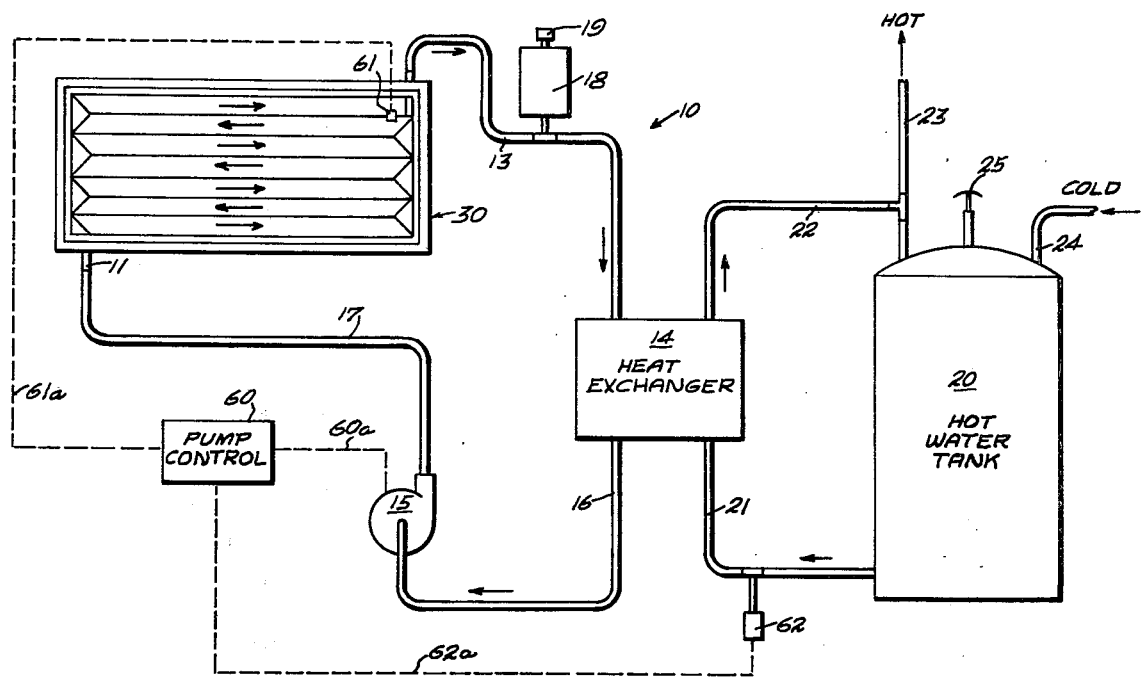
FIG. 1 is a schematic view of a closed-loop system utilizing a solar energy collector embodying the invention for heating the water in a household storage tank.

Referring in detail to the drawings, 10 denotes a closed-loop system shown in FIG. 1 to comprise a solar energy collector 30, constructed to embody the invention, having inlet and outlet conduits 11 and 12 to and from flat coil tubular array 40, respectively, connected in series from outlet conduit 12 through conduit 13 to heat exchanger 14 and through conduit 16 to pump 15. Conduit 17 from pump 15 to inlet 11 completes the closed-loop of system 10. An expansion tank 18, of conventional construction, branches off conduit 13 in relative close proximity to outlet conduit 12 and may be provided with a protective pressure relief valve 19. A heat transfer fluid, usually a solution of water and propylene glycol or other anti-freeze, is circulated by pump 15 through closed-loop system 10 and in passing through heat exchanger 14 is physically isolated from but thermally in close association with the water of the household hot water supply which also circulates therethrough. A water heating loop is seen to comprise an inlet conduit 21 to heat exchanger 14 from the bottom of hot water storage tank 20 and an outlet conduit 22 from heat exchanger 14 connecting to the hot water supply line 23 emerging from the top of tank 20. Water line 24 supplies the cold water under normal pressures from the city water supply and a pressure and temperature safety valve 25 of conventional construction protects tank 20 from a build up of excessive pressure.

Figure 2:
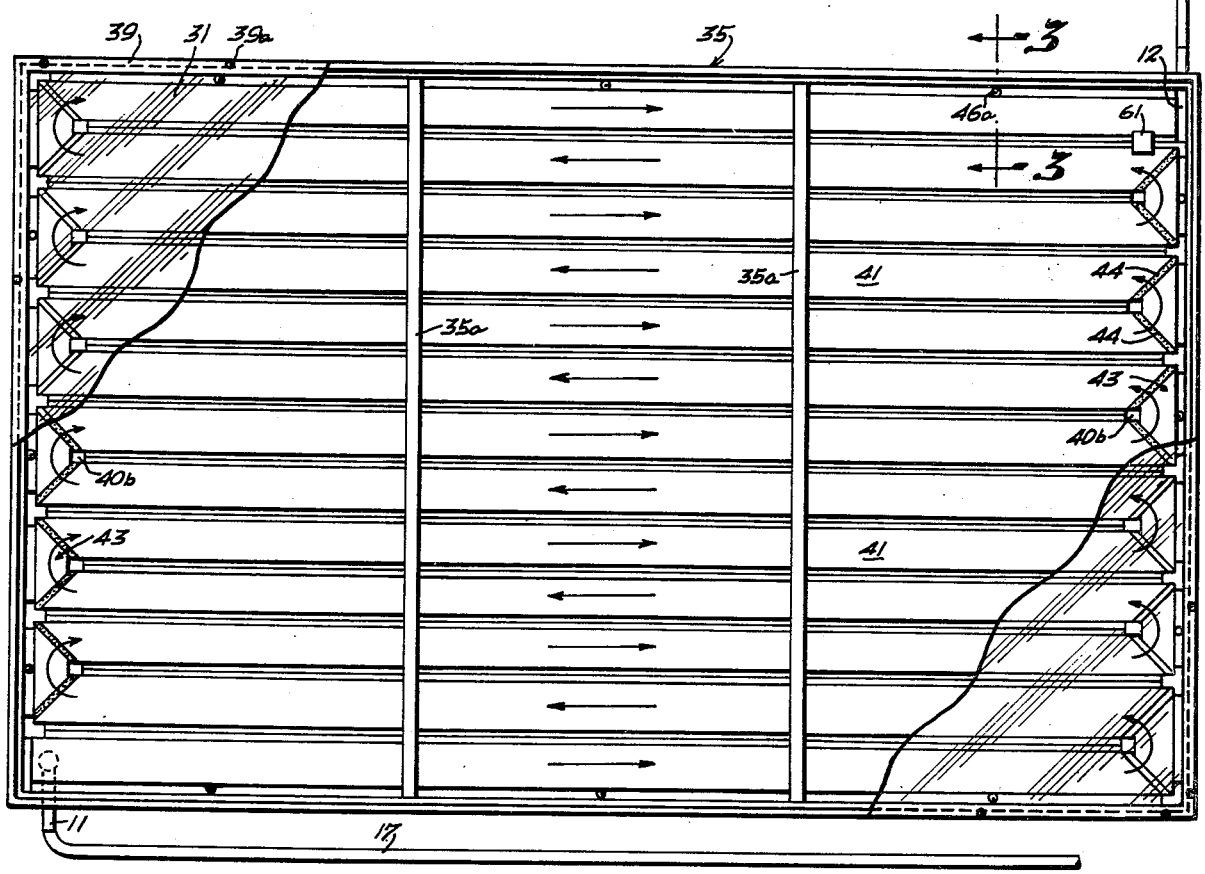
FIG. 2 is a top plan view of a solar energy collector constructed to embody the invention, a large center portion of the glass cover being broken away, and arrows are shown indicating the path of flow of the heat transfer fluid within the conduit.
Figure 3:
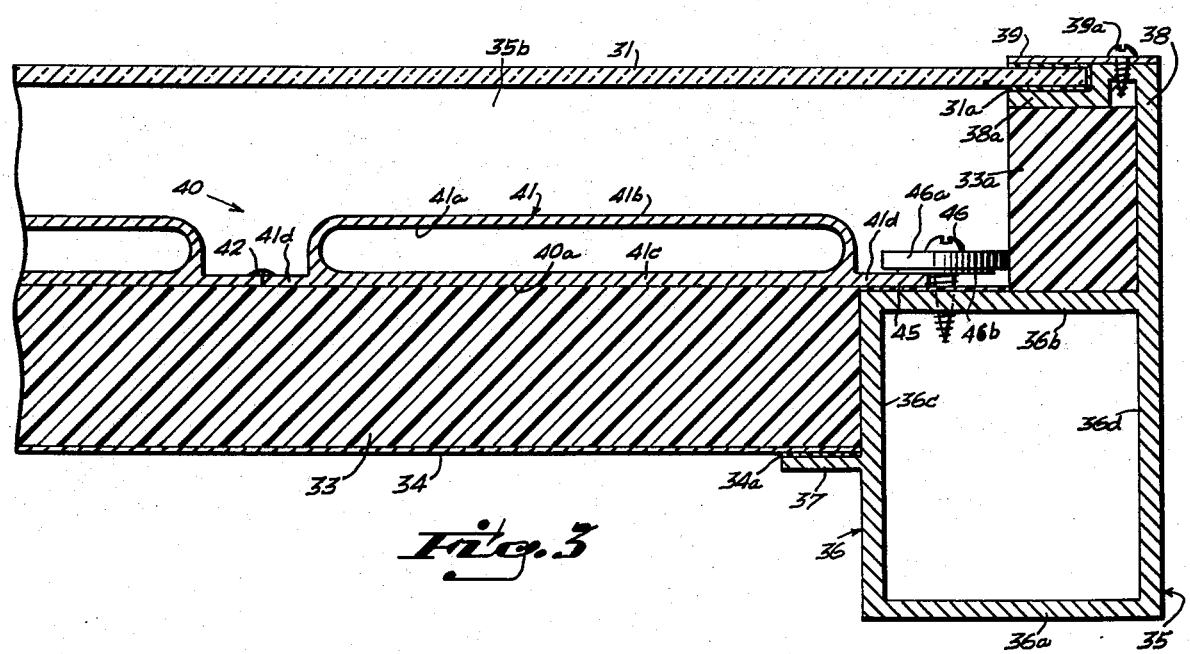
FIG. 3 is an enlarged sectional view taken on line 3—3 in FIG. 2 showing details of the flat coil tubular array and its encasement in the mounting frame between a glass cover and insulation backing.

Solar energy collector 30 is seen in FIGS. 2 and 3 to generally comprise a frame 35 having a three step interior facing structure mounting the flat coil array 40 in a weatherproof housing between glass cover 31 and insulation backing 33. Four lengths of a mounting frame aluminum extrusion 36 are welded into a rectangular configuration as frame 35, in the well understood manner. Each length of extrusion 36, as seen in FIG. 3, has a generally tubular body for strength and relative light weight and two longitudinal flanges located and shaped to provide, in cooperation with the tubular body, the three step interior structure for frame 35. Thus, the tubular body of each extrusion 36 is of rectangular cross-section having bottom, upper, inner and outer longitudinal sidewalls 36a, 36b, 36c and 36d, respectively, one of the flanges 37 extending inwardly from inner sidewall 36c providing the lower and innermost step on which insulation backing 33 is supported. The latter, which may be relatively thick sheet of polyurethane foam, cut to snugly fit against inner sidewalls 36c along the four sides thereof, has a relatively thin sheet 34 of aluminum adhesively secured to the downfacing or exterior surface thereof. Aluminum sheet 34 is suitably secured along the four edges thereof, as by adhesive strips 34a, to flanges 37 forming a waterproof seal. The other flange 38, generally L-shaped in cross-section, has a flat section thereof extending coplanar with outer sidewall 36d and forms with the latter each of the exterior sidewalls of frame 35. The other section of flange 38 extends parallel to upper wall 36b and is spaced therefrom providing the upper and outermost step of the interior facing structure of frame 35 and has a downwardly stepped edge portion 38a forming a ledge on which the peripheral border of glass cover 31 is supported. A waterproofing gasket 31a, made of suitable material, such as neoprene, fits the peripheral border of glass cover 31, the latter being secured in place by retaining strips 39, which may also be made of aluminum, one strip 39 extending along each of the four sides of frame 35 and retained in position by spaced screws 39a. Where glass cover 31 is sectionalized for increased strength, one or more transverse supporting ribs 35a may be used in the well understood manner as indicated in FIG. 2.

Flat coil tubular array 40 is formed of a plurality of straight tube lengths 41 arranged in parallel and connected at opposite ends thereof in staggered relation by headers 43, which, by providing 180° flow reversal therebetween of the circulating heat transfer fluid, combine the straight paths into the serpentine path characteristic of array 40 as indicated by the arrows in FIG. 2. Straight tube lengths 41 are cut from an aluminum extrusion, seen in FIGS. 3 and 4 to comprise a central conduit 41a having a flat elliptical cross-sectional shape, formed by flat top and bottom walls 41b and 41c, respectively, providing a substantially uniform height or thickness and a width of considerably greater dimension than the thickness. A pair of longitudinally extending relatively narrow flanges 41d are formed on opposite sides of the conduit coplanar with, that is, as lateral extensions of, the bottom wall 41c. Tube lengths 41 are located in parallel with adjacent flanges 41d in abutment and welded together by a plurality of elongated welds 42 which are spaced from each other along the length of flanges 41d.

Figure 4:
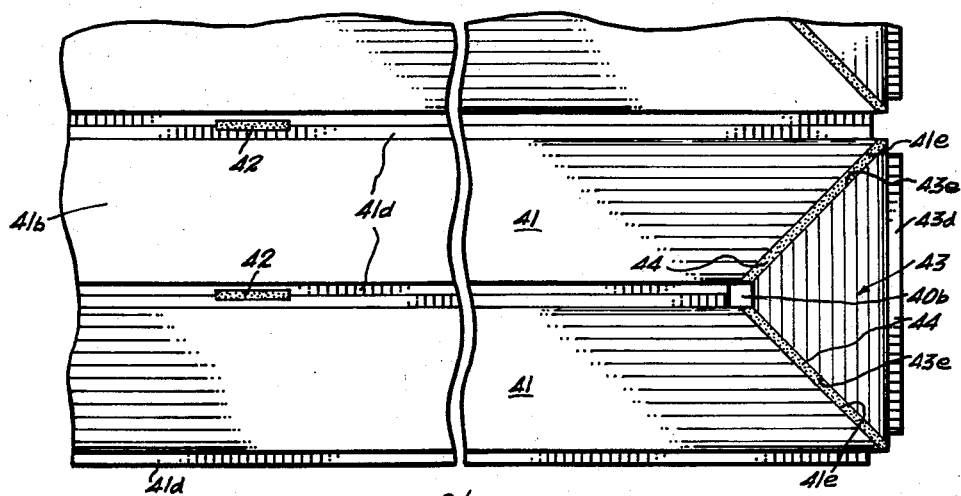
FIG. 4 is an enlarged fragmentary plan view of the right lower corner of the flat coil tubular array shown in FIG. 2 removed from the frame, one pair of the tubular sections being interconnected by a triangular shaped header for 180° flow reversal.

As best seen in FIG. 4, the ends 41e of each pair of tube lengths 41 connected by a header 43 are beveled inwardly at 45° angles to accommodate the triangular shape of the header 43 as an insert. Each header 43, in order to have a conduit of dimensions comparable to those of tube lengths 41, may be cut from a length of the same aluminum extrusion to have opposite beveled ends 43e, also at 45° angles, converging from a side of the extrusion having a longitudinal flange 43d and forming the base of the triangle to the opposite side forming a flattened apex. The flange at the flattened apex is cut away as are end portions of abutting flanges 41d thereby providing an opening 40b at the apex and clearance at the base to increase accessibility of welding. Welded miter joints 44 connect beveled ends 41e to ends 43e and extend completely around the conduit walls as watertight seams. The spacing afforded by flanges 41d and the cutbacks thereof forming openings 40b at the apices of headers 43 ensures visibility of each of the joints 44 in its entirely for locating any leaks which may develop as a result of improper welding during testing of the tubular array 40 which may be conducted under fluid pressure applied to the conduit interior prior to installation in frame 35. This visibility of and accessibility to welds 44 clearly facilitates repair and retesting of any defective weld so discovered and materially contribute to the reliability and durability of collector 30. The opposite ends of the serpentine conduit provided by flat coil tubular array 40 are sealed and suitably connected by welding or otherwise to conduit sections leading from frame 35 and designated in FIGS. 1 and 2 as inlet and outlet conduits 11 and 12, respectively, for use in system 10. It is understood, that, when use of collector 30 so dictates, the flow of the heat transfer fluid may be in the opposite direction with corresponding reversal of inlet and outlet conduit designation.

The non-reflective black exterior surface of array 40 which is required for maximum absorption of the solar heat rays may be achieved by anodizing the aluminum, thereby avoiding problems due to cracking or chipping of paint. For an overall black surface, welds 42 and 44 are touched-up with a black paint which may be of the type developed for aerospaces use.

Elongated welds 42 cooperate with welded joints 44 so that the bottom walls of headers 43, and bottom walls 41c and flanges 41d of straight tube lengths 41 provide array 40 with a coplanar flat bottom surface 40a which contacts insulation backing 33 when array 40 is mounted in position in frame 35. To this end, as will be clear from FIGS. 2 and 3, longitudinal flanges 43d of each of the headers 43 are arranged in alignment along the opposite side edges of flat coil tubular array 40 and provide segmented borders which are coplanar with and coact with the outermost flanges 41d located along the upper and lower longitudinal edges of array 40 as mounting means which rest on upper longitudinal sidewalls 36b of frame extrusion lengths 36. Thus, upper sidewalls 36b serve as the intermediate step of the interior facing stepped structure of frame 35. Suitable fasteners secure array 40 in position and are here shown as screws 46 spaced along upper sidewalls 36b adjacent mounting flanges 41d or 43d and having washers 46a engaging the latter. To prevent heat loss by conduction from array 40 to frame 35, insulation strips 45, which may be made of asbestos, extend between upper sidewalls 36b and flanges 41d or 43d, and likewise, insulation washers 46b of neoprene may be provided between washers 46a and flanges 41d or 43d. As an alternative to washers 46a, elongated strips of extruded stock (not shown) having a stepped downfacing surface to accommodate the thickness of flanges 41d or 43d may extend along sidewalls 36b and be secured by screws in a manner similar to the fastening of glass cover 31 by strips 39 and screws 39a.

To further reduce heat loss through frame 35 from the heat trapping chamber 35b, which is the enclosed air space between glass cover 33 and tubular array 40, elongated blocks 33a of insulation material, preferably of polyurethane foam, completely line the four sidewalls of chamber 35b, that is, are positioned against flanges 38 between upper sidewalls 36b and stepped edge portions 38a. Shielded vents (not shown) may be suitably provided in frame 35 for communicating chamber 35b with the exterior atmosphere for preventing fogging or other collection of moisture due to changes in relative humidity.

The operation of collector 30, which is installed on the roof or other location and orientated for optimum exposure of glass cover 31 and underlying tubular array 40 to the direct rays of the sun, and the heat transfer therefrom by system 10 to the water in tank 20 will now be apparent from FIG. 1. The high ratio of fluid conduit area exposed to solar radiation to the overall surface area of collector 30 augmented by flanges 41d and the heat trapping air space above the latter between the low vertical sidewalls of central conduits 41a, and the relatively large surface area of circulating heat transfer fluid in direct contact with the solar heat absorbing metal walls of conduit 41a afforded by the flat elliptical shape of the latter, all materially contribute to optimum efficiency. Thermal efficiency of collector 30 approximating 83% was established by tests made by approved procedures of a preferred embodiment of the invention in which each straight tube length 41 has an overall width of 4½ inches, each flange 41d has a width of ⅜ inch and the central conduit 41a has an I. D. ratio of height to width approximating 1 to 11, and exterior measurements of 3 and ¾ inches in width by ⅜ inch in height above the surface of flange 41d.

Pump 15, by means of wiring 60a, may be energized and operated by an electronic control 60 connected through wiring 61a and 62a to temperature sensors 61 and 62, respectively. Sensor 61 is installed in array 40 to monitor the outlet temperature of the heat transfer fluid, while sensor 62 monitors the water temperature leaving the bottom of storage tank 20 prior to circulation through heat exchanger 14, the latter in practice being located in close proximity to and at a level below the center of tank 20. While pump 15 is operating, that is, during the time predetermined temperature conditions, which have been preset in control 60, exist at the outlet of array 40 and at the bottom of tank 20 as monitored by sensors 61 and 62, respectively, heat absorbed from solar radiation impinging upon array 40 by the heat transfer fluid circulating therethrough in the closed-loop of system 10 is transferred to the water of the household hot water supply in heat exchanger 14. As the household water is heated in heat exchanger 14, convection currents are initiated causing circulation of heated water through outlet conduit 22 and hot water supply line 23 into the upper portion of tank 20 and a flow of the relatively cold water through conduit 21 from the bottom of tank 20 into heat exchanger 14.

It will be understood that solar collector 30 may be incorporated in any other system to perform its intended function and that a plurality of collectors 30 may be connected in parallel in a system for additional heating capacity.

A modified form of header construction is shown in FIGS. 5 to 8, inclusive, in which the flat coil tubular array 40 is formed of straight tube lengths 51 cut from the same aluminum extrusion as lengths 41, to comprise a central conduit 51a, flat top wall 51b, flat bottom wall 51c and opposite longitudinal flanges 51d fastened together by elongated welds 52, which, like welds 42, may each be 2 inches in length and are spaced about 2 feet apart from each other along flanges 51d. Straight tube lengths 51 have their opposite ends 51e cut transversely at right angles to their length instead of having their ends beveled as ends 41e of tube lengths 41.

Figure 5:
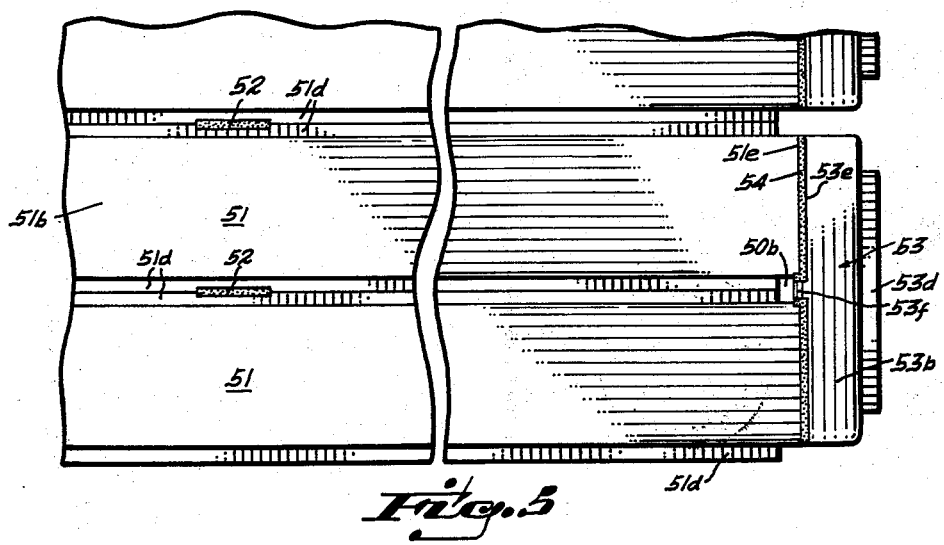
FIG. 5 is a view similar to FIG. 4 but showing an alternate form of header construction.
Figure 6:
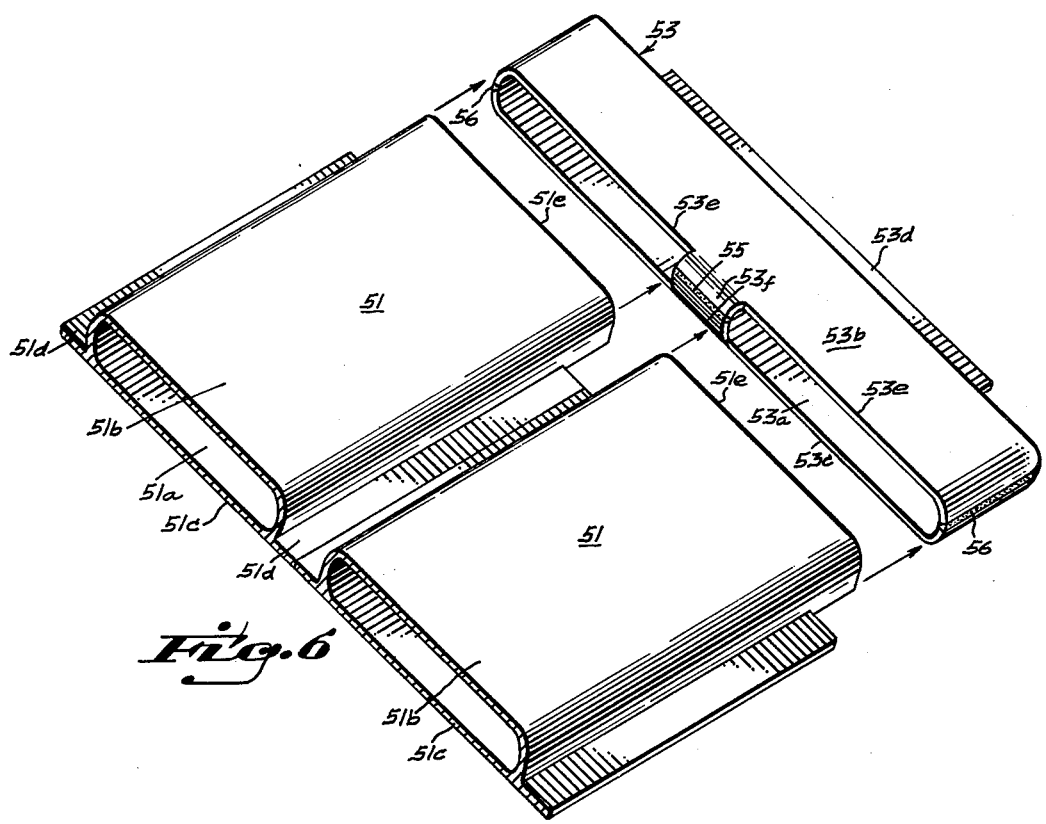
FIG. 6 is an enlarged, fragmentary, perspective and exploded view of the tube sections and header shown in FIG. 5.
Figure 7:
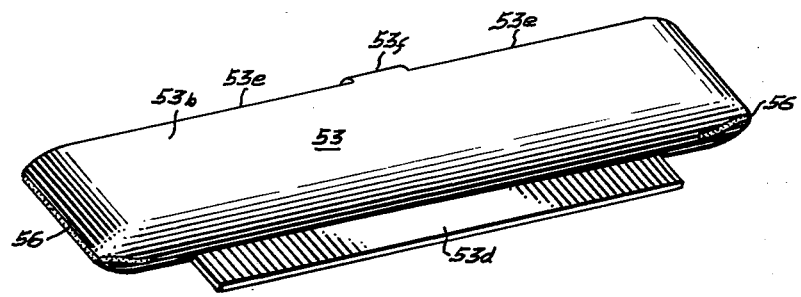
FIG. 7 is a perspective view of the header shown in FIGS. 5 and 6 before being welded in position and showing the side having the longitudinal flange cut back at opposite ends, the cut, shaped and welded ends and the flat top thereof.
Figure 8:
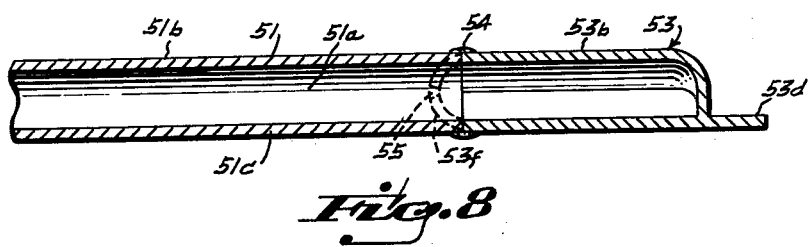
FIG. 8 is an enlarged sectional view taken on line 8—8 in FIG. 5.

Header 53 may each also be fashioned from the same aluminum extrusion as straight tube lengths 41 and 51 by cutting in half longitudinally a length thereof substantially equivalent to the width of the pair of tubular lengths 51 to be joined together. The longitudinal edge is then cut back from opposite ends towards the middle a distance slightly in excess of one half the height of conduit 53a to provide a pair of aligned edges 53e spaced apart by center tabs 53f extending from top and bottom walls 53b and 53c, respectively, center tabs 53f being bent toward each other and joined together by weld 55. As seen in FIG. 7, in forming header 53, longitudinal flange 53d is cut back at the opposite ends thereof leaving end portions of top and bottom walls 53b and 53c free to be properly cut, shaped and brought together by suitable means and joined by welds 56 forming neat, rounded, closed ends having rounded corners. Tabs 53f and weld 55 form a separation which fits between the conduit portion of adjacent tube lengths 51 so that the pair of aligned edges 53e substantially conform to and abut transverse ends 51e and are joined thereto by welds 54 which completely surround the conduit portion of adjacent tube lengths 51. As seen in FIG. 5, end portions of longitudinal flanges 51d are cut back providing openings 50b adjacent tabs 53f and weld 55. Openings 50b and the cutback of the pairs of longitudinal flanges 51d located between headers 53 alternating with openings 50b provide complete accessibility and visibility of welds 54, 55 and 56 facilitating the the testing and repair of array 40 hereinbefore described.

Welds 54, 55 and 56, by joining edges of the aluminum extrusion which are cut either longitudinally or transversely at right angles, create less stress risers and consequently considerably less cracking of the aluminum extrusion associated with such welded joints as compared to the frequency of cracking experienced in the construction utilizing welds 44 which connect edges cut at 45° to the longitudinal.

A practical application of collector 30, wherein frame 35 has approximate dimensions of 8 feet in length, 5 feet in width and 4 inches in thickness and accommodates an array 40 constructed with 13 straight tube lengths 41 for a surface area of about 40 sq. ft., efficiently heats the household water in tank 20 having an 80 gallon capacity.

The constructions of the solar energy collector herein disclosed are seen to achieve the several objects of the inventions and to be well adapted to meet conditions of practical use. As various possible embodiments might be made in this invention, and as various changes might be made in the disclosed construction, it is to be understood that all matters herein set forth and shown in the accompanying drawings are to be interpreted as illustrative and not in a limiting sense.

What is claimed is:

1. In a solar energy collector, a flat coil tubular array for circulating a heat transfer fluid through a single continuous serpentine conduit comprising a plurality of rigid straight tube sections extending substantially the length of the array and arranged in side-by-side parallel relation defining the width of the array, each tube section having a central conduit and longitudinal flanges along opposite sides of the conduit, substantially flat top and bottom walls defining the cross-sectional shape of the conduit as a flattened ellipse having the width substantially greater than the thickness, said longitudinal flanges of adjacent tube sections being positioned in abutment and welded together into a rigid structure with the tube sections disposed in coplanar relation, a plurality of headers interconnecting the ends of pairs of adjacent tube sections in staggered relation and having conduit sections communicating with the conduits of said pairs of adjacent tube sections for 180° flow reversal of said fluid to form said continuous serpentine conduit, each header having a pair of conduit end edges cut to abut conduit end edges of said pair of interconnected adjacent tube sections and being joined together by a welded waterproof seam extending completely around each conduit, and end portions of said longitudinal flanges being cut away for accessibility for welding and visibility for inspecting each of said welded seams.

2. The solar energy collector defined in claim 1, in which the interior dimensions of said elliptical cross-section of the central conduit of each tube section has a ratio of width to thickness on the order of 10 to 1.

3. The solar energy collector defined in claim 1, in which the ratio of the total width of each of the straight tube sections to the total width of both longitudinal flanges thereof is on the order of 6 and 1.

4. The solar energy collector defined in claim 1, in which each header has an exterior flange coplanar with said longitudinal flanges of the tube sections and extending in alignment with other similar flanges as segments of a border flange extending along the opposite transverse sides of the array and coacting with the outermost flanges of the tube sections located along the opposite longitudinal sides of the array as a mounting means for the array.

5. The solar energy collector defined in claim 1, in which each of said straight tube sections is cut from an aluminum extrusion, and said headers are cut and shaped from sections of said extrusion.

6. The solar energy collector defined in claim 5, in which each of said conduit end edges of each pair of tube sections is cut transversely at right angles to the length of the extrusion.

7. The solar energy collector defined in claim 6, in which said pair of abutting conduit end edges of each header is cut along the length of the extrusion.

8. A solar energy collector comprising a frame formed of four lengths of an aluminum extrusion welded into a rectangular configuration, each of said lengths having a tubular body of rectangular cross-section and two longitudinal flanges constructed and arranged to form a three step interior facing structure, a first of said flanges being L-shaped in cross-section and having one section thereof coplanar with an outer longitudinal sidewall of said tubular body forming therewith an exterior sidewall for said frame, the other section of said L-shaped flange extending inwardly from said exterior sidewall as an upper and outermost step of said three step structure, an upper longitudinal sidewall of said tubular body being spaced from and parallel to said upper and outermost step and forming the intermediate step, the second of said flanges, forming the lower and innermost step, projecting from and extending at right angles to an inner longitudinal sidewall of said tubular body and spaced from and parallel to said intermediate step, a glass cover mounted on said upper and outermost step, a flat coil tubular array for circulating a heat transfer fluid through a single continuous serpentine path thereof, said array having longitudinal and transverse border flanges overlying said intermediate step and secured thereto mounting the array in spaced relation to said glass cover and forming a heat trapping chamber therebetween bounded along four sides by uppor portions of said exterior sidewalls, heat insulation material supported on said lower and innermost step and sized to contact said tubular array, and elongated blocks to insulation material lining said upper portions of the exterior sidewalls between said upper and outermost and intermediate steps.

9. The solar energy collector defined in claim 8, in which a strip of thermal insulation extends between each of said border flanges of the array and said intermediate step.

* * * * *